United States Patent [19]

Shanks

[11] 4,394,368

[45] Jul. 19, 1983

[54] HIGH TEMPERATURE HYDROLYSIS OF ALUMINUM SULFATE SOLUTIONS

[75] Inventor: Donald E. Shanks, Reno, Nev.

[73] Assignee: The United States of America as represented by the Secretary of the Interior, Washington, D.C.

[21] Appl. No.: 327,539

[22] Filed: Dec. 4, 1981

[51] Int. Cl.³ .......................... C01F 7/26; C01F 7/74
[52] U.S. Cl. ................................ 423/556; 423/123; 423/128; 423/625; 23/305 A
[58] Field of Search ............... 423/556, 123, 127, 128, 423/625; 23/305 A

[56] References Cited

U.S. PATENT DOCUMENTS

| | | | |
|---|---|---|---|
| 1,415,308 | 5/1922 | Burkey | 423/556 |
| 2,215,183 | 9/1940 | Lawrence et al. | 423/556 |
| 4,044,115 | 8/1977 | Eisle et al. | 423/127 |
| 4,244,928 | 1/1981 | Ziegenbalg et al. | 423/128 |

Primary Examiner—Gary P. Straub
Attorney, Agent, or Firm—William S. Brown

[57] ABSTRACT

Aqueous aluminum sulfate solution is hydrolyzed at temperatures above about 300° C. to produce a basic aluminum sulfate product that is readily purified and converted to $Al_2O_3$.

3 Claims, 1 Drawing Figure

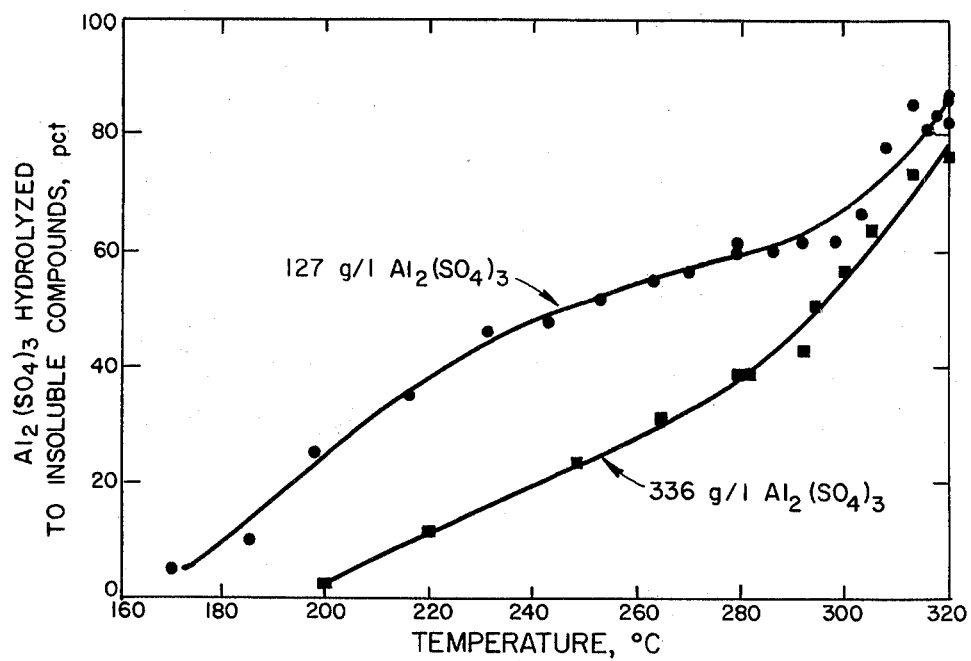

HIGH TEMPERATURE HYDROLYSIS OF ALUMINUM SULFATE SOLUTIONS

This invention relates to high temperature hydrolysis of aluminum sulfate solutions to produce an insoluble basic aluminum sulfate that is readily purified and converted to $Al_2O_3$ by calcining.

Many methods have been described in the literature for recovering cell-grade alumina from domestic ores, but none has proven to be economical. Sulfuric acid leaching of aluminous ores is an excellent means of liberating the aluminum, but no satisfactory method has been found for converting the resulting impure sulfate to cell-grade alumina. Direct crystallization of aluminum sulfate is not practical because it yields a soft, microscopic crystal mush that is difficult to handle, traps mother liquor, and is almost impossible to wash. The aluminum sulfate can be precipitated as a potassium alum as proposed by Thomas and Ingraham (The development of the Alum-Amine Process for the Recovery of Alumina from Shale, the Canadian Journal of Chemical Engineering, December 1960, pp. 220-222), but potassium sulfate is difficult to remove by washing to meet cell-grade alumina specifications. Maurel and Duhart (A Process for the Production of Alumina by the Action of Acids Upon Ores, British Pat. No. 1,250,178, Oct. 23, 1968) were able to produce pure alumina by repeated crystallizations with hydrogen chloride gas, but this process had a very complicated flow scheme because of the presence of hydrochloric and sulfuric acids. Davey and Scott (The Hydrolysis of Aluminum Sulphate Solutions at Elevated Temperatures, Australian Journal of Applied Science, Vol. 13, No. 4, December 1962) converted aluminum sulfate to insoluble basic aluminum sulfate by adding active alumina and heating in an autoclave to 220° C. The product was washed to remove impurities and calcined to produce cell-grade alumina. If the active alumina is not added, the yield is greatly reduced. Making active (high surface area $\eta$-$Al_2O_3$) alumina, however, is a touchy operation. It is also somewhat self-defeating to add part of the product back into solution.

It has now been found, according to the process of the invention, that an insoluble basic aluminum sulfate, $Al(OH)SO_4$, may be prepared by hydrolysis of aqueous aluminum sulfate solutions at temperatures above about 300° C. The $Al(OH)SO_4$ product is insoluble at room temperature in water and dilute acid, making it possible to wash out soluble impurities and entrained mother liquor. The washed and dried $Al(OH)SO_4$ is easily converted to $Al_2O_3$ by calcining, and has the advantage that only one mole of water must be removed for each mole of $Al_2O_3$ produced.

The feed solutions in the process of the invention are dilute aqueous solutions of aluminum sulfate prepared by conventional sulfuric acid leaching of calcined aluminous ores such as clays. The solutions will generally contain $Al_2(SO_4)_3$ in concentrations of about 100 to 300 grams per liter, as well as minor amounts of impurities such as iron, calcium, sodium, titanium and magnesium. Iron is readily removed by conventional solvent extraction procedures prior to hydrolysis.

It has been found that the temperature employed in the hydrolysis process is critical since temperatures below about 300° C. result in formation of hydronium alunite, $(H_3O)_2Al_6(SO_4)_4(OH)_{12}$, instead of the desired $Al(OH)SO_4$. In addition, as illustrated in the example below, the percent of $Al_2(SO_4)_3$ hydrolyzed to insoluble $Al(OH)SO_4$ rises relatively rapidly above about 300° C., thus providing a hydrolysis process of substantially improved efficiency. Optimum hydrolysis temperature will, however, vary somewhat with concentration of the $Al_2(SO_4)_3$ solution.

The hydrolysis process of the invention is preferably carried out in a closed system such as an autoclave. Thus, the pressure employed is the autogenous pressure at the operating temperature, generally being in the range of about 1230 to 1620 psig. A reaction time of about 1 hour is usually sufficient for hydrolysis of a high percentage of the $Al_2(SO_4)_3$ solution, although longer periods may be required for substantially complete hydrolysis. The reaction product is cooled to room temperature, preferably by water quenching, and the precipitated $Al(OH)SO_4$ is then separated by filtering.

Entrained impurities, such as unreacted aluminum sulfate, sodium and calcium, may be removed from the precipitated $Al(OH)SO_4$ by washing with water. The washed precipitate in then dried, and is readily converted to $Al_2O_3$ by conventional means, e.g., calcination at a temperature of about 1,000° to 1,200° C. for a period of about 2 hours.

The invention, and its advantages, will be more specifically illustrated by the following example.

EXAMPLE

This example illustrates the effects of hydrolysis temperature on the yield and composition of products of hydrolysis of $Al_2(SO_4)_3$ solutions. A series of hydrolysis reactions utilizing $Al_2(SO_4)_3$ concentrations of 127 and 336 g/l and temperatures ranging from 170° to 320° C. were carried out on 300 ml samples of $Al_2(SO_4)_3$ solutions. The samples were placed in an autoclave, which was sealed and heated rapidly to the hydrolysis temperature. The solution was held at hydrolysis temperature for 1 hour, and the reaction was abruptly terminated by quenching the calcined autoclave in cold water. The cooled autoclave was opened and the contents filtered to recover a clear viscous liquid fraction and a white crystalline product. The crystalline product was repulped with 300 ml of room temperature water for 5 minutes, filtered, dried overnight at 110° C. and weighed.

The washed hydrolysis product, the remaining $Al_2(SO_4)_3$ solution and the wash water were analyzed for aluminum and sulfate, and the structure of the hydrolysis product was examined by X-ray diffraction. In addition, the solutions were titrated for hydrogen ion concentration.

Results are shown in the FIGURE in which the amount of $Al_2(SO_4)_3$ hydrolyzed to insoluble product is plotted against hydrolysis temperatures for both the 127 and 336 g/l $Al_2(SO_4)_3$ solutions. As can be seen from the FIGURE, product yields are relatively rapid above about 300° C., particularly for the more dilute $Al_2(SO_4)_3$ solution, with maximum yields of 86 percent for the 127 g/l $Al_2(SO_4)_3$ solution and 76 percent for the 336 g/l solution at 320° C., the maximum operating temperature investigated. Higher operating temperatures were not employed since these would have substantially accelerated corrosion of the Hastelloy B autoclave. In addition, the compositions of the insoluble products formed at temperatures below about 300° C. were found, by X-ray diffraction patterns and stoichiometry, to correspond closely to the above-mentioned hydronium alunite formed by the probabale reaction:

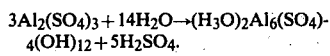

Compositions of insoluble products formed at the higher temperatures, on the other hand, corresponded closely to the basic aluminum sulfate, Al(OH)SO$_4$, formed by the probable reaction:

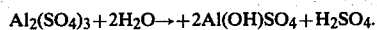

I claim:

1. A process for hydrolysis of dilute aqueous aluminum sulfate solution containing about 100-300 grams per liter of aluminum sulfate and minor amounts of impurities consisting essentially of maintaining said solution in a closed system at a hydrolysis temperature above 300° C. for a time sufficient to convert a high percentage of the aluminum sulfate to the insoluble basic aluminum sulfate, Al(OH)SO$_4$, and subsequently quenching the closed system in water.

2. The process of claim 1 in which the hydrolysis temperature is about 320° C.

3. The process of claim 1 in which the pressure employed is about 1230 to 1620 psig.